(12) United States Patent
Hellberg et al.

(10) Patent No.: US 8,940,227 B2
(45) Date of Patent: Jan. 27, 2015

(54) USE OF POLYESTER POLYAMINE AND POLYESTER POLYQUATERNARY AMMONIUM COMPOUNDS AS CORROSION INHIBITORS

(75) Inventors: Per-Erik Hellberg, Svenshogen (SE); Natalija Gorochovceva, Hjälteby (SE)

(73) Assignee: Akzo Nobel Chemical International B.V., Amersfoort (NL)

( * ) Notice: Subject to any disclaimer, the term of this patent is extended or adjusted under 35 U.S.C. 154(b) by 52 days.

(21) Appl. No.: 13/819,371

(22) PCT Filed: Aug. 26, 2011

(86) PCT No.: PCT/EP2011/064691
§ 371 (c)(1),
(2), (4) Date: Feb. 27, 2013

(87) PCT Pub. No.: WO2012/028542
PCT Pub. Date: Mar. 8, 2012

(65) Prior Publication Data
US 2013/0156638 A1   Jun. 20, 2013

Related U.S. Application Data

(60) Provisional application No. 61/378,115, filed on Aug. 30, 2010.

(30) Foreign Application Priority Data

Aug. 30, 2010   (EP) ..................................... 10174517

(51) Int. Cl.
| | | |
|---|---|---|
| B08B 17/00 | (2006.01) | |
| C23F 11/00 | (2006.01) | |
| A61L 9/01 | (2006.01) | |
| B08B 9/00 | (2006.01) | |
| C08G 63/668 | (2006.01) | |
| C08G 63/685 | (2006.01) | |
| C09D 167/00 | (2006.01) | |
| C09K 8/54 | (2006.01) | |
| C10G 75/02 | (2006.01) | |
| C10L 1/238 | (2006.01) | |
| C10M 149/14 | (2006.01) | |
| C23F 11/10 | (2006.01) | |
| C23F 11/14 | (2006.01) | |
| C23F 11/173 | (2006.01) | |
| C10L 1/22 | (2006.01) | |
| C10L 1/222 | (2006.01) | |
| C10L 10/04 | (2006.01) | |
| C10L 1/2387 | (2006.01) | |

(52) U.S. Cl.
CPC .............. *C23F 11/00* (2013.01); *C08G 63/668* (2013.01); *C08G 63/6854* (2013.01); *C09D 167/00* (2013.01); *C09K 8/54* (2013.01); *C10G 75/02* (2013.01); *C10L 1/238* (2013.01); *C10M 149/14* (2013.01); *C23F 11/10* (2013.01); *C23F 11/143* (2013.01); *C23F 11/145* (2013.01); *C23F 11/173* (2013.01); *C10L 1/221* (2013.01); *C10L 1/2222* (2013.01); *C10L 10/04* (2013.01); *C10L 1/2387* (2013.01); *C10M 2217/041* (2013.01); *C10N 2230/12* (2013.01); *C10N 2230/64* (2013.01); *C10G 2300/4075* (2013.01)
USPC ........... 422/7; 422/6; 422/12; 422/16; 422/17; 134/6; 134/22.1

(58) Field of Classification Search
CPC .......... C02F 1/042; C23F 11/00; C23F 14/00; C23F 15/00; C23F 17/00
USPC .............. 422/6–7, 12–17; 424/76.8; 252/175, 252/387; 134/6, 22.1
See application file for complete search history.

(56) References Cited

U.S. PATENT DOCUMENTS

| | | | | |
|---|---|---|---|---|
| 2,638,449 | A | * | 5/1953 | White et al. ................... 508/476 |
| 2,689,828 | A | | 9/1954 | Smith et al. |
| 3,014,864 | A | | 12/1961 | Hughes et al. |
| 3,123,634 | A | | 3/1964 | Udelhofen et al. |
| 3,762,873 | A | | 10/1973 | Oude |
| 4,238,349 | A | | 12/1980 | Larsen et al. |
| 4,730,079 | A | | 3/1988 | Hofinger et al. |
| 4,781,730 | A | | 11/1988 | Stoldt et al. |
| 4,885,111 | A | | 12/1989 | Bose et al. |
| 5,034,444 | A | | 7/1991 | Yun et al. |
| 5,178,786 | A | | 1/1993 | Jahnke et al. |
| 5,250,225 | A | | 10/1993 | Oppenlaender et al. |
| 5,284,495 | A | | 2/1994 | Baillargeon et al. |
| 5,352,377 | A | | 10/1994 | Blain et al. |

(Continued)

FOREIGN PATENT DOCUMENTS

| | | |
|---|---|---|
| CA | 1336843 | 8/1995 |
| EP | 0035263 | 9/1981 |

(Continued)

OTHER PUBLICATIONS

English Patent Abstract of EP0035263A2, Sep. 9, 1982.

(Continued)

*Primary Examiner* — Monzer R Chorbaji
(74) *Attorney, Agent, or Firm* — Matthew D. Kellam

(57) ABSTRACT

The present invention relates to the use of a polyesteramine or a polyester polyquaternary ammonium compound as a corrosion inhibitor for metal surfaces, and to a method for protecting a metal surface from corrosion by contacting the metal surface with said corrosion inhibitor.

18 Claims, No Drawings

(56) References Cited

U.S. PATENT DOCUMENTS

| | | |
|---|---|---|
| 5,385,674 A | 1/1995 | Kupfer et al. |
| 5,456,731 A | 10/1995 | Blain et al. |
| 5,582,792 A | 12/1996 | Dougherty et al. |
| 5,599,779 A | 2/1997 | Karol et al. |
| 5,710,110 A | 1/1998 | Cooperman et al. |
| 6,224,642 B1 | 5/2001 | Daly et al. |
| 6,432,895 B1 | 8/2002 | Bigorra et al. |
| 2004/0102332 A1 | 5/2004 | Thompson et al. |
| 2004/0164278 A1 | 8/2004 | Dahlmann et al. |
| 2006/0135628 A1 | 6/2006 | Newman et al. |

FOREIGN PATENT DOCUMENTS

| | | |
|---|---|---|
| EP | 0106234 | 4/1984 |
| EP | 0192358 | 8/1986 |
| EP | 0299348 | 1/1989 |
| EP | 0333135 | 9/1989 |
| EP | 0498178 A2 | 8/1992 |
| EP | 0572881 A1 | 12/1993 |
| EP | 0647768 A2 | 4/1995 |
| EP | 1949963 A1 | 7/2008 |
| JP | 52-78729 | 12/1975 |
| JP | 57-151700 | 3/1981 |
| JP | 58-162697 | 3/1982 |
| JP | 58-198593 | 5/1982 |
| WO | WO99/59958 | 11/1999 |
| WO | WO2004/099350 A1 | 11/2004 |
| WO | WO2011/000895 A1 | 1/2011 |

OTHER PUBLICATIONS

English Patent Abstract of EP0106234A1, Apr. 25, 1984.
English Patent Abstract of EP0299348A2, Jan. 18, 1989.
Derwent Abstract of JP57151700, Mar. 13, 1981.
Derwent Abstract of JP58162-697-A, Mar. 23, 1982.
Derwent Abstract of JP58198-593-A, May 13, 1982.
Derwent Abstract of JP52-078729-A, Dec. 26, 1975.
Standards for Laboratory Evaluation of Oilfield Corrosion Inhibitors, Sankara Papavinasam, et al, NACE International, vol. 46, No. 5, pp. 46-51 Materials Performance May 2007.
"Review of QSAR Moels for Biocentration", Pavan et al, EUR 22327 EN, 2006.
International Search Report for PCT Application No. PCT/EP2011/064691, Completion date Sep. 16, 2011.
European Search Report for Application No. 10174517.2; completion date Jan. 10, 2011.
International Search Report for PCT Application No. PCT/EP2010/059325; completion date Sep. 20, 2010.
European Search Report for Application No. 09164487.2; completion date Dec. 7, 2009.
Machine Translation of EP0333135, Sep. 20, 1989.
Machine Translation of EP0498178, Aug. 12, 1992.

* cited by examiner

USE OF POLYESTER POLYAMINE AND POLYESTER POLYQUATERNARY AMMONIUM COMPOUNDS AS CORROSION INHIBITORS

CROSS-REFERENCES TO RELATED APPLICATIONS

This application is a National Stage entry of International Application PCT/EP2011/064691, filed Aug. 26, 2011, which claims the benefit of European Patent Application No. 10174517.2, filed Aug. 30, 2010 and U.S. Patent Application No. 61/378,115, filed Aug. 30, 2010. The contents of the aforementioned applications are incorporated herein by reference in their entireties.

TECHNICAL FIELD OF INVENTION

The present invention relates to the use of a polyesteramine or a polyester polyquaternary ammonium compound as a corrosion inhibitor for metal surfaces, and to a method for protecting a metal surface from corrosion by contacting the metal surface with said corrosion inhibitor.

TECHNICAL BACKGROUND OF THE INVENTION

Corrosion is often a serious issue in oil- and gas field processes, e.g. in transportation of crude oil, and in oil or gas wells. This could be due to dissolved gases such as carbon dioxide or hydrogen sulfide causing so-called sweet and sour corrosion, respectively, on ferrous metal surfaces. Another serious source of corrosion is the often high electrolyte concentrations in the water which is co-produced with the oil and gas. Further, severe risks of corrosion are obvious when inorganic or organic acids are used in so-called acid stimulation or fracturing operations encountered in order to increase the productivity of oil and gas wells. Also in drilling operations there often is a need to use corrosion inhibitors, e.g. in drilling fluids. Corrosion problems are also often an issue in downstream processes, such as refineries, when e.g. salts or acid components from crude oils being processed are causing corrosion of ferrous metal.

Different types of nitrogen-containing compounds, such as e.g. fatty amines, alkoxylated fatty amines, amidoamines, and quaternary ammonium compounds, are well-known bases for corrosion inhibitor formulations used in various kinds of systems.

U.S. Pat. Nos. 5,352,377 and 5,456,731, for example, disclose reaction products of hydrocarbyl-substituted carboxylic anhydrides, more specifically hydrocarbyl-substituted succinic anhydrides, and aminoalkanols, e.g. ethoxylated fatty alkyl monoamines or ethoxylated fatty alkyl propylenediamines, that can provide effective antiwear, antirust, and corrosion-inhibiting properties in lubricant and fuel applications.

U.S. Pat. No. 5,178,786 relates to corrosion-inhibiting compositions and their use in functional fluids, especially aqueous hydraulic fluids. These compositions comprise at least four components A, B, C, and D, where component D is an ester-salt formed by the reaction of an alkyl or alkenyl succinic anhydride with an alkanolamine. The preferred alkanolamines are, e.g., dimethylethanolamine, diethylethanolamine, and methylethylethanolamine, and thus the preferred products D are not polymers.

There are also a number of patent publications where oligomeric/polymeric nitrogen-containing ester-linked compounds based on dicarboxylic acids/anhydrides and ethoxylated (fatty alkyl)amines are used in other applications/systems. For example, in EP 0 572 881 a product obtained from an oxyalkylated primary fatty amine and a dicarboxylic acid is disclosed for use in a process for separation of a petroleum emulsion of the water-in-oil type. U.S. Pat. No. 4,781,730 discloses reaction products of a polybasic acid and a polyhydroxyalkanolamine that are components in a fuel additive composition for reduction of valve seat recession in a vehicle. U.S. Pat. No. 5,034,444 discloses a rheological additive for non-aqueous coating compositions that may be the reaction product of an alkoxylated aliphatic nitrogen-containing compound and an organic polycarboxylic anhydride or acid. EP 0 035 263 A2 discloses polyester compounds produced by reaction between a dicarboxylic acid and an alkoxylated tertiary amine and their use as textile softeners. U.S. Pat. No. 5,284,495 discloses oligomers/polymers, which can be prepared by polymerising an anhydride, e.g. phthalic anhydride, and long-chain amine containing diols, e.g. ethoxylated octadecylamine. These products are used as additives that improve the low-temperature properties of distillate fuels. U.S. Pat. No. 5,710,110 discloses a drilling fluid composition containing an oil well fluid anti-settling additive, which is a reaction product wherein the reactants are one or more alkoxylated aliphatic amino compounds and an organic polycarboxylic anhydride or acid.

In the non-prepublished patent application PCT/EP2010/059325 polymeric products obtainable by the reaction of an alkoxylated fatty amine with a dicarboxylic acid derivative, optionally quaternised, are described. The said products are used for corrosion inhibition, but have a different structure and performance than the products of the present invention.

Although a variety of corrosion inhibitors to be used in the presence of freshwater, seawater, or brine have been developed, there is still a need for more effective corrosion inhibitors, especially if these also can be shown to fulfill stringent regulatory requirements for environmental adaptation. Thus, there is a great need for new corrosion inhibitors with an acceptable biodegradation profile combined with a low disposition to bioaccumulation and an excellent technical performance.

SUMMARY OF THE INVENTION

It is an object of the present invention to at least partially meet the above-mentioned need in the art and to provide a corrosion-inhibiting compound that exhibits high efficacy.

It is another object of the present invention to provide corrosion-inhibiting compounds that have advantageous environmental properties.

The present inventors have found that these objects can be met by certain polyester polyamine or polyester polyquaternary ammonium compounds, obtainable by the condensation of a fatty acid, a dicarboxylic acid or a derivative thereof, and an alkanolamine, where the condensation product optionally has been quaternised by a suitable alkylating agent.

Thus, in a first aspect, the present invention relates to the use of the aforementioned products as corrosion inhibitors for metal surfaces.

In a second aspect, the present invention relates to a method for protecting a metal surface from corrosion by contacting the metal surface with an effective amount of a corrosion inhibitor as mentioned above.

These and other aspects of the present invention will be apparent from the following detailed description of the invention.

DETAILED DESCRIPTION OF THE INVENTION

The present invention relates to the use of a product obtainable by the condensation of a fatty acid, or mixture of acids, having the formula $R^1COOH$ (I), wherein $R^1CO$ is an acyl group having 8 to 24, preferably 12 to 24, more preferably 14 to 24, and most preferably 16-24, carbon atoms, that may be saturated or unsaturated, linear or branched; and a dicarboxylic acid or a derivative thereof having the formula (IIa) or (IIb)

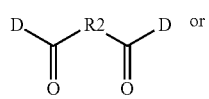
(IIa)

(IIb)

wherein D is —OH, —Cl, or —$OR^3$, wherein $R^3$ is a C1-C4 alkyl group; R2 is selected from the group consisting of a direct bond, an alkylene radical of the formula —$(CH_2)_z$—, wherein z is an integer from 1 to 10, preferably from 2 to 4, and most preferably 4, a substituted alkylene radical wherein said alkylene radical is substituted by 1 or 2 —OH groups, the group —CH=CH—, a cycloalkylene, a cycloalkenylene and an arylene group;
with an alkanolamine having the formula (III)

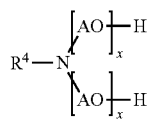
(III)

wherein each x independently is a number between 1 and 5, and Σx on molar average is a number between 2 and 10, AO is an alkyleneoxy group having 2-4, preferably 2, carbon atoms, $R^4$ is a C1-C3 alkyl group or a group [AO], wherein AO and x have the same meaning as above, or a partial or wholly quaternised derivative thereof; optionally said reaction between the fatty acid, the dicarboxylic acid, and the alkanolamine is followed by a further reaction step wherein part or all of the nitrogen atoms are quaternised by reaction with an alkylating agent $R^5X$, wherein $R^5$ is a hydrocarbyl group, preferably a C1-C4 alkyl group or the benzyl group, and $X^-$ is an anion derived from the alkylating agent $R^5X$; as a corrosion inhibitor for metal surfaces.

The condensation products described above may be represented by the general formula

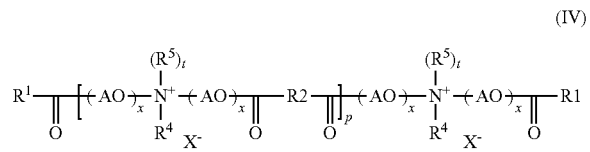
(IV)

wherein $R^1$, AO, x, R2, and $R^4$ have the same meaning as above; $R^5$ is a hydrocarbyl group, preferably a C1-C4 alkyl group or the benzyl group, and $X^-$ is an anion derived from the alkylating agent $R^5X$; t is a number 0 or 1, preferably 1, and p is typically a number within the range 1-15, and is on average at least 1, preferably at least 2, and most preferably at least 3. The average value of p will depend on the molar ratios of the compounds (I), (IIa) or (IIb) and (III) in the reaction mixture, as well as on the reaction conditions.

It is to be understood that there may be molecules present in the product mixture that are not completely esterified with fatty acids, but the products of formula IV are the key compounds.

Suitable examples of fatty acids of formula (I) are 2-ethylhexanoic acid, n-octanoic acid, n-decanoic acid, n-dodecanoic acid, n-tetradecanoic acid, n-hexadecanoic acid, palmitoleic acid, n-octadecanoic acid, oleic acid, linoleic acid, linolenic acid, eicosanoic acid, docosanoic acid, tetracosanoic acid, coco fatty acid, rape seed fatty acid, soya fatty acid, tallow fatty acid, tall oil fatty acid, gadoleic acid and erucic acid.

The dicarboxylic acid derivative of general formula (IIa) or (IIb) may be a dicarboxylic acid as such, a dicarboxylic acid chloride, a diester of a dicarboxylic acid, or a cyclic anhydride of a dicarboxylic acid. The most suitable derivatives are the dicarboxylic acids and their corresponding cyclic anhydrides. Illustrative examples of dicarboxylic acid derivatives include oxalic acid, malonic acid, succinic acid, glutaric acid, adipic acid, pimelic acid, phthalic acid, tetrahydrophthalic acid, maleic acid, malic acid, tartaric acid, their corresponding acid chlorides, their corresponding methyl or ethyl esters, and their corresponding cyclic anhydrides.

Suitable alkanolamines are N-methyl diethanolamine and N-methyl diisopropanolamine, optionally alkoxylated with ethylene oxide, propylene oxide, butylene oxide or mixtures thereof. If more than one alkylene oxide is reacted with the alkanolamine, the different alkylene oxides may be added in blocks in any order, or may be added randomly. The alkoxylation may be performed by any suitable method known in the art by using e.g. an alkaline catalyst, such as KOH, or an acid catalyst.

A suitable method for the preparation of the products which are the subject of the present invention comprises the steps of mixing a compound of formula (I) as defined above with a compound of formula (IIa) or (IIb) as defined above and a compound of formula (III) as defined above, effecting an esterification condensation reaction between the compounds in the mixture, adding an alkylating agent to the condensation reaction product, and effecting a quaternisation reaction of the condensation product.

The esterification condensation reactions taking place between the compounds (I), (IIa) or (IIb), and (III) are well-known per se in the art. The reactions are preferably performed in the presence of an esterification catalyst, such as a Brönstedt or Lewis acid, for example methanesulfonic acid, p-toluenesulfonic acid, citric acid or $BF_3$. When a dicarboxylic acid derivative of formula (IIa) is used, wherein D is O—$R^4$, the reaction is a transesterification, which alternatively could be performed in the presence of an alkaline catalyst. Also the carboxylic acid (I) may be added as e.g. its methyl ester. Alternatively, other conventional techniques known by the person skilled in the art could be used starting from other derivatives of the dicarboxylic acids, such as their anhydrides or their acid chlorides.

As would also be clear to a person skilled in the art, alternatively the different esterification reactions could be performed in more than one step, e.g. by first condensing the dicarboxylic acid derivative (IIa) or (IIb) with the alkanolamine (III), and then adding the carboxylic acid (I) in a next step. The reactions can take place with or without solvents added. If solvents are present during the reaction, the solvents should be inert to esterification, e.g. toluene or xylene.

An example of a polymer of formula (IV) has the structure shown below

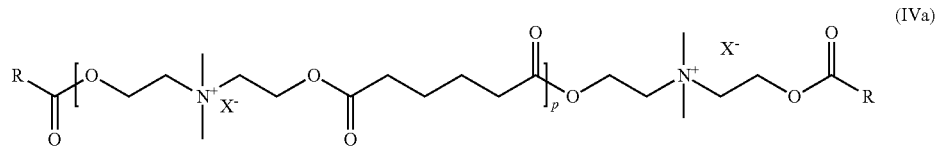

(IVa)

The esterification condensation reaction between the components (I), (IIa) or (IIb), and (III) is suitably effected by heating the mixture at a temperature suitably between 120 and 220° C. for a period of from 2 to 20 hours, optionally at a reduced pressure of from 5 to 200 mbar.

When t in formula (IV) is 0, the product is a tertiary polyesteramine compound, and when t is 1, the product is a polyester polyquaternary ammonium compound. Quaternisation is a reaction type that is well-known in the art. For the quaternisation step, the alkylating agent $R^5X$ is suitably selected from the group consisting of methylchloride, methylbromide, dimethylsulfate, diethylsulfate, dimethylcarbonate, and benzylchloride, the most preferred alkylating agents being methylchloride, dimethylsulfate, dimethylcarbonate or benzyl chloride. As stated above, the quaternisation may suitably be performed on the condensation product between the fatty acid, alkanolamine, and diacid. Principally, following an alternative synthesis route, the quaternisation of the alkanolamine (III) may be performed as a first step, which would then be followed by an esterification reaction between (I), (IIa) or (IIb), and quaternised (III). Either a part of, or all of, the nitrogen atoms may be quaternised. As a further alternative, if a quaternised derivative is desired, a reaction product between the tertiary alkanolamine (III) and a dicarboxylic acid derivative (IIa) or (IIb) may be reacted with an alkylating agent, e.g. methylchloride or dimethylsulfate, to yield a product that is partly or totally quaternised, before reaction with the carboxylic acid (I). Also, the two processes can be combined such that first a partially quaternised compound is esterified and the resulting polyester is further quaternised.

Quaternisation reactions are normally performed in water or a solvent, such as isopropanol (IPA) or ethanol, or in mixtures thereof. Other alternative solvents could be ethylene glycol monobutyl ether, di(ethylene glycol) monobutyl ether (BDG), and other ethylene and propylene glycols, such as monoethylene glycol (MEG) and diethylene glycol (DEG). The reaction temperature of the quaternising reaction is suitably in the range of from 20 to 100° C., preferably at least 40, more preferably at least 50, and most preferably at least 55° C., and preferably at most 90° C. The heating is preferably stopped when the amount of basic nitrogen is ≤0.1 mmol/g, as measured by titration with 0.1 M perchloric acid in glacial acetic acid.

Corrosion inhibiting products where all nitrogen atoms of the product are quaternary are preferred.

The molar ratio between the fatty acid, or mixture of acids, having the formula $R^1COOH$ (I) and the alkanolamine (III) in the reaction mixture is suitably 1:1.2 to 1:10, more preferably 1:1.5 to 1:5, still more preferably 1:2 to 1:4, and most preferably 1:2 to 1:3, and the ratio between the fatty acid (I) and the dicarboxylic acid or derivative (IIa) or (IIb) is suitably 2:1 to 1:8, preferably 1:1 to 1:8, more preferably 1:1.2 to 1:6, still more preferably 1:1.5 to 1:5, even more preferably 1:1.5 to 1:4, yet more preferably 1:1.5 to 1:3, and most preferably 1:1.5 to 1:2.5.

wherein RC=O is an acyl group having 8-24 carbon atoms, preferably 12 to 24 carbon atoms, and p is a number of at least 1, preferably at least 2, and most preferably at least 3.

To produce a product according to the example above wherein p is 3, 4 moles of methyldiethanolamine are reacted with 2 moles of a C8-C24 carboxylic acid and 3 moles of adipic acid, after which the product is quaternised by, e.g., methylchloride.

The products disclosed in the examples in the experimental section, according to the GPC/SEC analysis described below, possess a polymeric nature and hereinafter a product obtainable by the above-mentioned condensation and quaternisation is referred to as a "polymeric esteramine product" or a "polymeric quaternary ammonium ester product".

In the working examples the products of the present invention have been shown by GPC/SEC analysis to consist for >86% w/w of polymer molecules with two fatty acid units, two or more alkanolamine units, and one or more diacid/acid anhydride units.

Thus, the products of the present invention should preferably consist for >65% w/w, more preferably for >75% w/w, and most preferably for >85% w/w of molecules with two fatty acid units, two or more alkanolamine units, and one or more diacid/acid anhydride units.

Further, the GPC/SEC analysis in combination with fraction analysis using mass spectroscopy reveals that almost all molecule components in the product (>85% w/w) have a molecular weight>700 Dalton. Details on the analysis procedure are given below in the experimental section. All molecular weights as presented herein are determined by this procedure.

In different international regulations products with Mw>700 are considered too large to penetrate biological membranes and thereby not to bioaccumulate in the feed chain, see e.g. Manuela Pavan, Andrew P. Worth and Tatiana I. Netzeva "Review of QSAR Models for Bioconcentration", EUR 22327 EN, European Commission, Directorate—General Joint Research Centre, Institute for Health and Consumer Protection, European Communities, 2006. This is thus an advantage of the products of the present invention from an environmental point of view.

Examples of this kind of product have been described in U.S. Pat. No. 6,432,895 and EP 1949963 A1, which relate to products that are alkanolamine esters based on esterification reactions of optionally alkoxylated alkanolamines, dicarboxylic acids, and fatty acids, as well as cationic surfactants and ester quats obtainable therefrom. The products are claimed to be useful in totally different technical fields than the present invention, namely as components for the production of fabric softeners and hair-care compositions, and as collectors for the flotation of non-sulfidic minerals and ores, respectively.

The corrosion inhibitors of the present invention may be used for protection of metal surfaces, preferably ferrous metals or alloys, such as iron and steel, of pipelines, pumps, tanks and other equipment preferably used in oil- and gas fields or refineries in all of the above-mentioned situations.

With regard to the use of the polymeric esteramine or polymeric quaternary ammonium ester product corrosion inhibitors in various flow lines, the fluid content can vary over wide ranges, e.g. oil cuts may vary from 1% in field situations to 100% in e.g. refineries, and the composition of the possibly co-transported water can vary a lot as well when it comes to e.g. dissolved solids and salts contents. For example, the vast majority of seawater has a salinity of 3.1-3.8% by weight, being on the average about 3.5% in the world's oceans, but the water in the flow lines, when present, could even have a salt content of up to 7% by weight, e.g. up to 6%, such as up to 4%. On the other hand, the water may also be fresh or brackish water with lower salt contents, for example as low as 0.3%, even as low as 0.05% and down to 0.01%; brackish water may exhibit a large variation from time to time having a salt content of about 0.05% up to about 3%.

Typically, the metal surfaces to be protected will be in contact with water of differing salt content, as exemplified above.

In the preferred procedure of this invention, the polymeric esteramine or polymeric quaternary ammonium ester corrosion inhibitors are added to a flowing liquid which may contain both oil and water, at any point in a flow line upstream of the point or line that is intended to be protected. The dosage of corrosion inhibitor needed to obtain sufficient protection varies with the application, but dosing is suitably in such an amount that the concentration at the point of protection is between 1 and 2,000 ppm (by weight), preferably between 1 and 500 ppm, and most preferably between 1 and 150 ppm. Even though continuous dosage is the preferred use of the compounds of this invention, another possible mode is batch treatment, where the preferred dosage is between 1 and 5,000 ppm.

In addition to the polymeric esteramine or polymeric quaternary ammonium ester corrosion inhibitor bases of this invention, other ingredients may also be added to the corrosion-inhibiting compositions in order to e.g. improve handling under different climate conditions or to further improve the performance under different conditions. Examples of such ingredients are organic or inorganic acids, such as acetic acid, citric acid, and hydrochloric acid, in which case the amines will be predominantly present as salts; a dispersing or cleaning surfactant, such as nonionic ethylene oxide adducts; water-miscible solvents, such as methanol, ethanol, isopropanol, butanol or glycols such as butyl diglycol, ethylene glycol monobutyl ether, monoethylene glycol; scale inhibitors; biocides, such as alkylbenzyldimethyl ammonium chloride, dialkyldimethyl ammonium chloride, alkylamidopropyldimethylamine oxides or quaternary ammonium salts, e.g. alkylbis(hydroxyethyl)methyl quaternary ammonium chloride; and other corrosion inhibitors, such as other amines, amides, imidazolines or amphoterics. In order to further improve the corrosion inhibition efficacy, a synergist such as sodium thiosulfate or 2-mercaptoethanol could be added.

EXAMPLES

General Experimental

Molecular Weight Determination

The molecular weights and/or molecular weight ranges given in the examples in the experimental section were determined by the following method:

For separation, a SEC (Size Exclusion Chromatography) column was used. This means that porous particles are used to separate molecules of different sizes, and the molecules with the largest space-filling volume (more strictly, hydrodynamic radius) have the shortest retention times. Thus, in essence, in a SEC system the largest molecules elute first and the smallest molecules elute last.

The samples were dissolved in tetrahydrofuran and injected on a GPC/SEC-system (Gel Permeation Chromatography/Size Exclusion Chromatography), and then the fractions collected were analysed by mass spectrometry.

Analytical Description For Molecular Weight Determination of Polymer

The sample was dissolved in tetrahydrofuran and injected on a SEC-system equipped with three columns to separate the different homologues from each other. Each peak was collected as one fraction and the solvent was evaporated. The residue of each fraction was dissolved in acetonitrile/water 95/5 containing 0.5% acetic acid and injected via direct infusion into the ion trap MS detector. The molecular weights were determined for the different fractions. With molecules of very similar structure analysed by refractive index detector, area % can be approximated to weight %.

Analytical Conditions SEC

Precolumn: Phenogel 5µ linear 50×7.8 mm (Phenomenex)
Columns: Phenogel 5µ 300×7.8 mm, three columns in series with pore sizes 500 Å, 100 Å, 50 Å (Phenomenex)
Mobile phase: Tetrahydrofuran
Flow: 0.8 ml/min
Injection volume: 100 µl
Detector: Refractive Index Analytical Conditions Mass Spectrometer Direct infusion via syringe pump into LCQDuo (ThermoFinnigan) Ion Trap with ESI positive mode
Full Scan Mass Range: 150-2000 m/z Example 1

Tallow fatty acid (Tefacid; 230.1 g, 0.82 mole), methyl diethanolamine (195.3 g, 1.64 mole) from Fluka, and adipic acid (179.7 g, 1.23 mole) from Fluka were added to a round-bottomed flask fitted with a condenser, a thermometer, a heating mantle, a nitrogen inlet, and a mechanical stirrer. The reaction mixture was slowly heated to 174° C. Commencing at 150° C., the water produced during the reaction started to distil off. After 3.5 h, vacuum was applied gradually in order to more completely remove the water. In 4 h, the endpoint vacuum of 16 mbar was reached. The progress of the reaction was monitored by titration for acid value as well as by $^1$H-NMR spectroscopy. After 7 h at 174° C. and 16 mbar the desired product was obtained. The acid value of the product was then 0.183 meq/g. 541 g of product were obtained. By using the SEC/MS method described above the product was shown consist for >86 SEC area-% of molecules with two fatty acid units, two or more alkanolamine units, and one or more diacid/acid anhydride units. Further, the GPC/SEC analysis in combination with fraction analysis using mass spectroscopy reveals that almost all molecule components in the product (>85% w/w) have a molecular weight>700.

Example 2

A polyester polyquaternary amine was synthesised as follows:

In the first step, oleic acid (479.3 g, 1.69 mole), methyl diethanolamine (498.5 g, 4.18 mole) from Fluka, and adipic acid (458.6 g, 3.14 mole) from Fluka were added to a round-bottomed flask fitted with a condenser, a thermometer, a heating mantle, a nitrogen inlet, and a mechanical stirrer. The reaction mixture was slowly heated to 174° C. Commencing at 156° C., the water produced during the reaction started to distil off. After 3 h, vacuum was applied gradually in order to more completely remove the water. In 3 h, the endpoint vacuum of 37 mbar was reached. The progress of the reaction was monitored by titration for acid value as well as by $^1$H-NMR spectroscopy. After 9 h at 174° C. and 37 mbar the desired product was obtained. The acid value of the product was then 0.248 meq/g. 1280 g intermediate product were obtained.

In the second step, 302.6 g of the polyester obtained from the first step and 54 g of water as solvent were added to a stirred autoclave and heated to 59° C. Methylchloride (50 g) was added in one hour. Post-reaction was then carried out for 11 h at 72±2° C.

$^1$H-NMR spectroscopy showed that no unquaternised amine was left. 378 g of the final product were obtained as a dark brown viscous liquid containing 13% w/w of water.

Example 3

A polyester polyquaternary amine was synthesised as follows:

The first step is described in Example 1.

In the second step, 240.2 g polyester from the first step and 43.5 g butyl diglycol as solvent were added to a stirred autoclave and heated to 57° C. Methylchloride (36.6 g) was added in 90 minutes. Post-reaction was then carried out for 10 h at 93±3° C. $^1$H-NMR spectroscopy showed that no unquaternised amine was left. 252 g of the final product were obtained as a paste containing 13.6% w/w of BDG.

The chain length of the individual molecules and the distribution of the different molecules in the product are not expected to change during step 2 of the synthesis. However, the Mw of each molecule containing one or more methyl diethanol amine fragments is higher after quaternisation, and consequently the Mw of the product as a whole will increase slightly as compared to the product of Example 1.

Example 4

Corrosion Inhibition Performance in Brine With Inhibitor Dosed to a Model Oil Phase The tests were carried out using the well-known "bubble test" method, see for instance the discussion in NACE International, Vol. 46, No. 5, pp 46-51 (May 2007), where corrosion rate is monitored by linear polarisation resistance (LPR). First a baseline corrosion rate in the medium is established, and then corrosion rates with different amounts of inhibitor added are measured. In this case the inhibitor was dosed to a model oil phase in order to study how well the active component can transfer to the brine phase and give a good protection of the steel coupon located there. This is an important indicator of the performance in real field use. In this particular case 10% of the total volume was kerosene (model oil) while the rest was brine.

The detailed conditions for the tests were as follows:

| | |
|---|---|
| Temperature | 55° C. |
| $CO_2$ | $CO_2$ Saturated at ambient pressure (~0.9 bara partial pressure) |
| Liquids | 90% Typical "Forties" (North Sea water) synthetic brine as shown below: |
| | Chloride = 42,539 mg/l |
| | Sulfate = 0 mg/l |
| | Barium = 173 mg/l |
| | Calcium = 1979 mg/l |
| | Strontium = 351 mg/l |
| | Magnesium = 377 mg/l |
| | Sodium = 24,973 mg/l |
| | Potassium = 341 mg/l |
| | Bicarbonate = 200 mg/l |
| | 10% Kerosene |
| Electrode | Fabricated from AISI 1018 (UNS G10180), polished to 600 grit finish, degreased, rinsed, and dried |
| Inhibitor Concentration | 4 hour precorrosion without inhibitor, then dose with 10 ppm of inhibitor and evaluate corrosion rate for at least 8 h, then add inhibitor so that the next level of total inhibitor dosage is reached according to Table 1. After each addition the corrosion rate is measured for at least 8 h. |
| Gas and partial pressure | Ambient pressure test. Maximum partial pressure 1 bara (less saturated water vapour pressure at test temperature). |
| Corrosion Monitoring | LPR ± 10 mV step perturbation with a 2 minute time constant. A Stearn-Geary constant of 25 mV was used to calculate corrosion rates from LPR data. Corrosion rates were monitored throughout each test with a measurement taken every 30 minutes. |
| Container | 1,000 ml electrochemical test cell |
| Procedure | Prepare solution and purge with $CO_2$ until oxygen is less than 10 ppb. Polish electrodes and place them in the electrochemical test cell under a $N_2$ blanket. Transfer the solution to the test cell under $N_2$ blanket. Control the temperature using a proportional controller. Switch gas supply to the required gas mixture. Monitor the corrosion rate for at least 4 hours. Inject neat inhibitor using a micropipette and monitor the corrosion rate until stable. |
| Dosage | The corrosion inhibitor is dosed into the kerosene phase and dosages given refer to active corrosion inhibitor (10, 25 and 50 ppm). |
| Formulation | Product of Example 1 was formulated as follows prior to testing: |
| | 30% base product |
| | 3% glacial acetic acid |
| | 15% n-BuOH |
| | 5% BDG |
| | Balance water |
| | The products of Examples 2 and 3 were not formulated, just diluted in water to appropriate dosage concentration before addition to the test cell. |

The % protection was calculated from the following equation:

$$\% \text{ protection} = (1-(x/y))*100$$

where x=corrosion rate in the presence of corrosion inhibitor (mm/year)
y=corrosion rate in the absence of corrosion inhibitor (mm/year)

The results are given in Table 1.

TABLE 1

| | % Protection at various dosages | | |
|---|---|---|---|
| Substance | 10 ppm | 25 ppm | 50 ppm |
| Quaternary amine* (comparison) | −1.1 | 8.2 | 3.9 |
| Product of Example 1 | 72 | 81 | 89 |
| Product of Example 2 | 92.8 | 95.3 | 96.5 |
| Product of Example 3 | 96.6 | 98.7 | 98.9 |

*C12-C16 Cocoalkyl di-methyl benzyl quaternary amine, a standard chemical sometimes used in oilfield corrosion inhibition formulations
Note:
A negative % protection value indicates higher corrosion than the baseline value with no inhibitor added.

Note: A negative % protection value indicates higher corrosion than the baseline value with no inhibitor added.

These figures demonstrate that the products of Examples 1, 2, and 3, contrary to the comparison, manage to transfer to the aqueous phase and give an excellent corrosion protection under representative conditions also at quite low addition levels.

Example 5

Biodegradability

It is nowadays a well-established fact that a reasonable biodegradability often is required by society and authorities for man-made organic compounds that are used in applications where they could end up reaching the environment. For certain geographical and/or application areas certain minimum levels of biodegradability are in addition stated by regulatory bodies.

Compounds of the present invention were tested for biodegradability in seawater, following GLP standards, according to OECD Guideline for testing of chemicals, section 3; Degradation and accumulation, No. 306: biodegradability in seawater, Closed Bottle test. The biodegradation after 28 days for the products synthesised in Example 2 and Example 3 was >60%. These examples demonstrate the generally good biodegradability of the compounds according to the invention.

The invention claimed is:

1. A method for inhibiting corrosion of a metal surface, the method comprising contacting the metal surface with a corrosion-inhibiting product obtainable by the reaction of a fatty acid, or mixture of acids, having the formula $R^1COOH$ (I), wherein $R^1CO$ is an acyl group having 8 to 24 carbon atoms, that may be saturated or unsaturated, linear or branched; and a dicarboxylic acid or a derivative thereof having the formula (IIa) or (IIb)

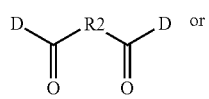

(IIa)

(IIb)

wherein D is —OH, —Cl, or —OR$^3$, wherein R$^3$ is a C1-C4 alkyl group; R$^2$ is selected from the group consisting of a direct bond, an alkylene radical of the formula —(CH$_2$)$_z$—, wherein z is an integer from 1 to 10, a substituted alkylene radical wherein said alkylene radical is substituted by 1 or 2 —OH groups, the group —CH=CH—, a cycloalkylene, a cycloalkenylene, and an arylene group;

with an alkanolamine having the formula (III)

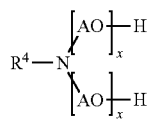

(III)

wherein each x independently is a number between 1 and 5, and Σx on molar average is a number between 2 and 10, AO is an alkyleneoxy group having 2-4 carbon atoms, R$^4$ is a C1-C3 alkyl group or a group [AO]$_x$ wherein AO and x have the same meaning as above, or a partial or wholly quaternised derivative thereof; optionally said reaction between the fatty acid, the dicarboxylic acid, and the alkanolamine is followed by a further reaction step wherein part or all of the nitrogen atoms are quaternised by reaction with an alkylating agent R$^5$X, wherein R$^5$ is a hydrocarbyl group, and X$^-$ is an anion derived from the alkylating agent R$^5$X.

2. The method according to claim 1 wherein the product consists of >65% w/w of molecules with two fatty acid units, two or more alkanolamine unit, and one or more diacid/acid anhydride units.

3. The method according to claim 1 wherein the product has the formula

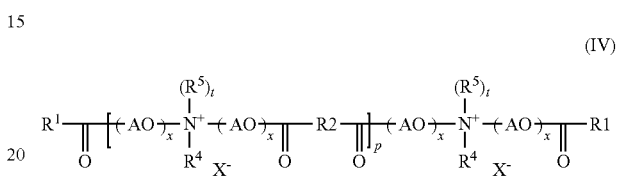

(IV)

wherein R$^1$, AO, x, R2, and R$^4$ have the same meaning as in claim 1; R$^5$ is a hydrocarbyl group, and X$^-$ is an anion derived from the alkylating agent R$^5$X; t is a number 0 or 1; and p is a number within the range 1-15, and is on average at least 1.

4. The method according to claim 3, wherein t=1.

5. The method according to claim 4 wherein R$^5$ is a C1-C4 alkyl group or the benzyl group.

6. The method according to claim 4 wherein the alkylating agent R$^5$X is selected from the group consisting of methylchloride, methylbromide, dimethylsulfate, diethylsulfate, dimethylcarbonate and benzylchloride.

7. The method according to claim 3 wherein more than 50% by weight of the molecules has a value of p≥3.

8. The method according to claim 1, wherein R$^1$CO is an acyl group having 16 to 24 carbon atoms.

9. The method according to claim 1, wherein R2 is an alkylene radical of formula —(CH$_2$)$_z$—.

10. The method according to claim 9, wherein z is 4.

11. The method according to claim 1, wherein x=1.

12. The method according to claim 1, wherein the molar ratio between the fatty acid, or mixture of acids, of structure (I) and the alkanolamine (III) in the reaction mixture is 1:1.2 to 1:10.

13. The method according to claim 1, wherein the metal surfaces are part of pipelines, pumps, tanks and other equipment used in oil- and gas fields or oil refineries.

14. The method according to claim 1, wherein the corrosion-inhibiting product is added to a flowing liquid at any point in a flow line upstream of the point or line intended to be protected.

15. The method according to claim 1 wherein the product consists of >75% w/w of molecules with two fatty acid units, two or more alkanolamine unit, and one or more diacid/acid anhydride units.

16. The method according to claim 1 wherein the product consists of >85% w/w of molecules with two fatty acid units, two or more alkanolamine unit, and one or more diacid/acid anhydride units.

17. The method according to claim 1, wherein the molar ratio between the fatty acid, or mixture of acids, of structure (I) and the dicarboxylic acid or derivative (IIa) or (IIb) is 2:1 to 1:8.

18. The method according to claim 1, wherein the molar ratio between the fatty acid, or mixture of acids, of structure (I) and the alkanolamine (III) in the reaction mixture is 1:1.2 to 1:10, and the molar ratio between the fatty acid, or mixture of acids, of structure (I) and the dicarboxylic acid or derivative (IIa) or (IIb) is 2:1 to 1:8.

* * * * *